United States Patent [19]

Windsor et al.

[11] 4,078,250

[45] Mar. 7, 1978

[54] LOG-ANTILOG CONVERSION FOR A DIGITAL RADAR SYSTEM

[75] Inventors: David F. Windsor; Kanwalnain S. Rekhi, both of Sunnyvale, Calif.

[73] Assignee: The Singer Company, Binghamton, N.Y.

[21] Appl. No.: 692,816

[22] Filed: Jun. 4, 1976

Related U.S. Application Data

[63] Continuation of Ser. No. 499,262, Aug. 21, 1974, abandoned.

[51] Int. Cl.² ............................ G06F 5/00; G06F 7/38
[52] U.S. Cl. ...................................... 364/715; 235/154
[58] Field of Search ............... 235/152, 156, 164, 197, 235/150.53, 154; 340/347 DD; 328/145

[56] References Cited

U.S. PATENT DOCUMENTS

| | | | |
|---|---|---|---|
| 3,194,951 | 7/1965 | Schaefer | 235/154 |
| 3,402,285 | 9/1968 | Wang | 235/160 |
| 3,436,533 | 4/1969 | Moore et al. | 235/197 X |
| 3,514,521 | 5/1970 | Burchard et al. | 35/10.4 |
| 3,610,901 | 10/1971 | Lynch | 235/152 |
| 3,718,988 | 3/1973 | Ball et al. | 35/10.4 |
| 3,885,323 | 5/1975 | Kaase et al. | 35/10.4 |

OTHER PUBLICATIONS

J. N. Mitchell, Jr., "Computer Multiplication and Division Using Binary Logarithms", IRE Trans. on Electronic Computers, vol. EC-11, No. 4, 8-1962, pp. 512-517.

M. Combet et al., "Computation of the Base Two Logarithm of Binary Numbers", IEEE Trans. on Electronic Computers, vol. EC-14, No. 6, 12-1965, pp. 863-867.

*Primary Examiner*—Jerry Smith
*Attorney, Agent, or Firm*—Paul Hentzel; James C. Kesterson

[57] ABSTRACT

Linear domain numbers are converted into standard characteristic-mantissa format by left shifting the leading zeros out of the mantissa portion and into the characteristic portion. The resulting normalized mantissa M is separated into a MSB portion $m$ and a LSB portion $n$: where $$M = m + n,$$

and $$m \gg n$$

to accomodate the approximate relationship $$\text{Log}(M) \simeq \text{log term} + \text{correction term} \simeq \text{Log}(m) + 2n/2m' + n$$

where $m'$ = the MSB portion of $m$.

Look up tables are provided for supplying the two terms for each mantissa received. The digital radar landmass systems then performs computations using the approximate logs. The answers are returned to the linear domain by an antilog circuit.

6 Claims, 2 Drawing Figures

LOG-ANTILOG CONVERSION FOR A DIGITAL RADAR SYSTEM

This is a continuation of application Ser. No. 499,262, filed Aug. 21, 1974, now abandoned.

BACKGROUND OF THE INVENTION

1. Field of the Invention

This invention relates to a log-antilog circuit system, and more particularly, to such a system used in a simulated digital radar system.

2. Description of the Prior Art

Heretofore the rate at which data could be generated and processed was limited by the hardware computation time. Each multiplication, division, or exponentiation required a finite time.

SUMMARY OF THE INVENTION

It is therefore an object of this invention to provide a log-antilog computation system in which the hardware computation time is minimized.

It is a further object of this invention to provide a log-antilog computation system in which hardware tables size is minimized.

It is another object of this invention to provide a log-antilog computation system in which hardware computations are expedited by a log approximation technique with nominal sacrifice of accuracy.

BRIEF DESCRIPTION OF FIGS. 1 AND 2

Further objects and advantages of the present invention and the operation thereof will become apparent from the following detailed description taken in conjunction with the drawings in which:

FIG. 1 is a logic diagram of a log circuit which processes input numbers into the log domain to expedite computations; and FIG. 2 is a logic diagram of an antilog circuit which restores the log numbers of FIG. 1 to the linear domain subsequent to the computation.

GENERAL OPERATION

Referring to FIG. 1, there is shown a log circuit logic diagram 10. An input binary number 12 for which the log is to be determined appears at input 14; and an input characteristic 16, which locates the binary point of input number 12, appears at input 18. A normalizer circuit 20 receives input number 12 and eliminates any leading zeros for putting input number 12 into a mantissa form(-- a number between 1.00000 and 2.00000) to facilitate log determination. A left shifter 22 shifts input number 12 to the left until the leading "zeros" have been displaced and a "one" appears in the most significant place. A priority encoder 24 gives the number of displaced leading "zeros" and forwards the leading zero count to a characteristic logic curcuit 26. Characteristic circuit 26 contains a subtractor 28 which subtracts the leading zero count from input characteristic 16 to form the characteristic portion of the log appearing at an output 30 CHAR of log circuit 10. The top 16 bits of normalized number of mantissa remaining in left shifter 22 are forwarded to a log block 32 where its log is determined by a log table 34 to form the mantissa portion of the log at output 30 MANT. Output 30 forwards both portions of the log to a computation block 36 which performs the desired mathematical operations.

FIG. 2 shows an antilog circuit 50 for receiving the characteristic and mantissa portions of the output of computation block 36 on input 52 CHAR and input 52 MANT. Circuit 50 restores the computation block output to the original linear domain which is available on antilog circuit output 54. Input 52 MANT forwards the mantissa portion to an antilog block 56 where an antilog table 58 determines the antilog of the mantissa portion. The antilog is forwarded to a denormalizer circuit 60 where a right shifter 62 restores leading zeros, moving the binary point to the desired place. The denormalized antilog then appears at output 54 ready to interface with the next logic phase of the digital radar system. The characteristic portion of the computation block output at input 52 CHAR is processed through a characteristic logic circuit 64 and appears at denormalizer 60. The characteristic portion passes through a control logic 66 to establish the leading zeros by shifting right shifter 62.

Complex digital computation involving multiplications, divisions, exponentiations, etc., can be done more easily in log domain when speed is of paramount important and 100% accuracy is not required. Real time digital radar simulation is one such application. Conventional log and antilog tables to the base two, required for a 16-bit number, contain about 65,536 entries each. An approximation embodiment discussed below reduces the table size to 2048 entries each, a table size more easily handled with commonly available programmable read-only memories.

In the log domain, the multiplications and divisions are reduced to additions and subtractions, respectively. Exponentiation is reduced to simple multiplication (easily handled with log of log numbers). Addition and subtraction are easier and faster to implement than multiplication and division. The delays introduced for table look-ups are minimal as compared to time consumed by conventional multiplication and division operations.

DETAILED DESCRIPTION

Figure 1:
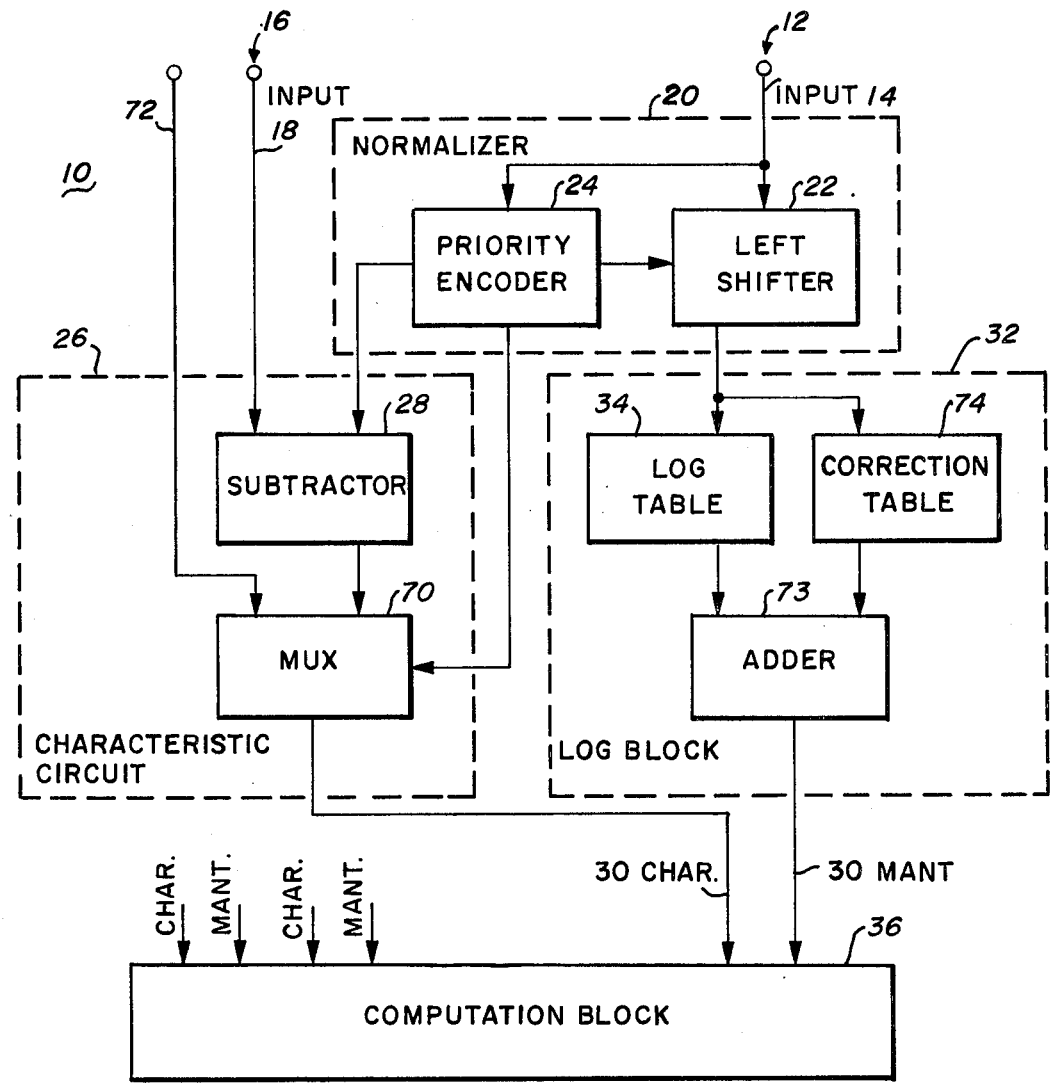
Figure 2:
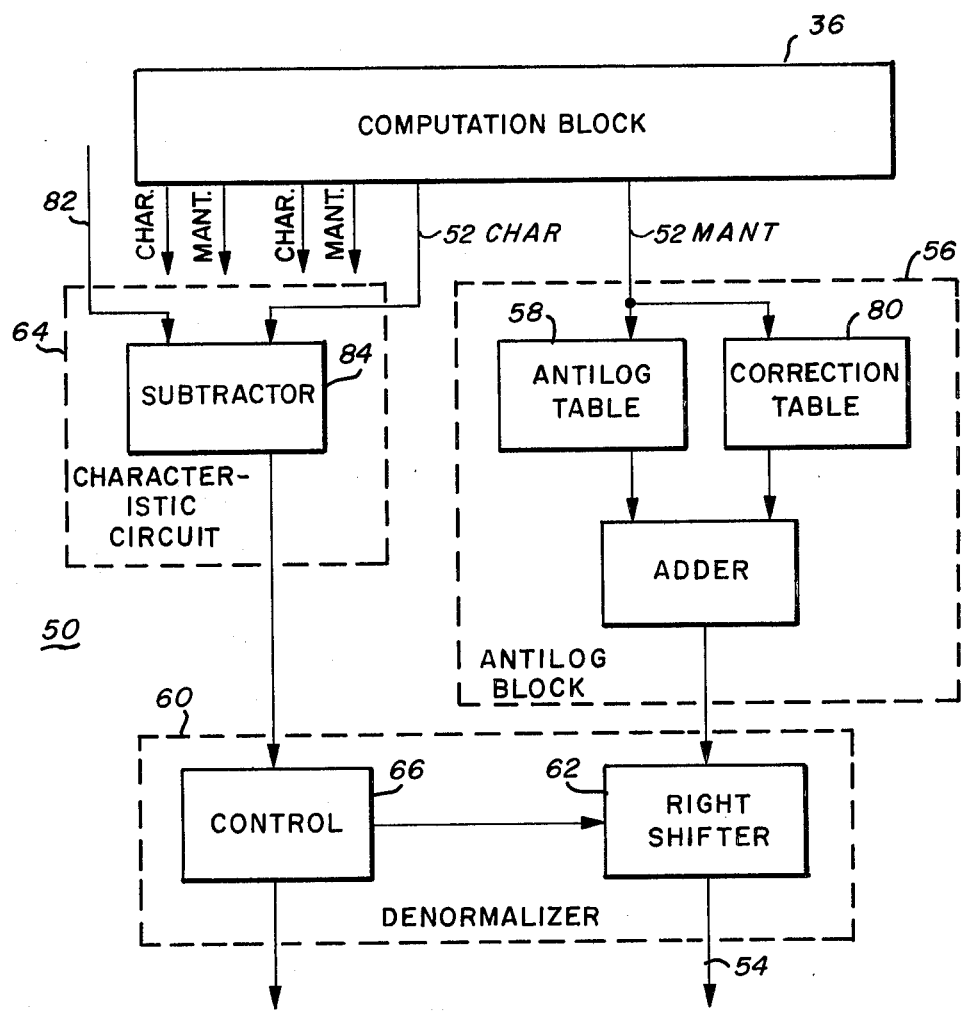

Log table 34 in the FIG. 1 example is to the base two and contains PROMS to look up logs of normalized 16-bit numbers between 1 and 1.99997 (1.000 0000 0000 0000 and 1.111 1111 1111 1111).

The log of any such number is a value between 0 and 0.99998 (or 0.0000 0000 0000 0000 and 0.1111 1111 1111 1111). Normalizer 20, at the input of log table 34, can receive and normalize any number of up to 24 bits, for example. The binary point can be located anyplace within or without the 24 bits. Normalization to establish standard mantissa format entails shifting input number 12 to the left repeatedly until a 'one' is encountered at the most significant bit. Characteristic number 16 at input 18 specifies the location of the binary point in input number 12. The log characteristic of input number 12 is input characteristic 16 minus the number of left shifts needed to normalize input number 12. If input number 12 is zero, an alternate characteristic can be substituted through a multiplexer 70 which receives the characteristic of log (0) at input 72. Characteristic 16 is an 8-bit positive or negative integer in 2's complement format. The smallest value is binary 1000 0000 or −128 decimal, and the largest value is binary 0111 1111 or +127 decimal. The mantissa of input number 12 (the normalized output of normalizer 20) is a positive fraction between binary 0.0000 0000 0000 0000, or decimal 0.0, and binary 0.1111 1111 1111 1111, or decimal 0.999984741. The log of input number 12 is formed by adding its characteristic 30CHAR to its mantissa. This process involves juxtaposition of characteristic 30

CHAR to the left of its mantissa and placing a binary point in between (e.g., 0010 1000.0110 0001 1000 1001).

The contents of log table 34 and correction table 74 may be computed in the following manner: the log of any number M to the base $e$ is $$\text{Log}_e(M) = \text{Log}_e(m+n)$$

where $M = m+n = \text{Log}_e(m) + 2[n/2m+n + 1/3(n/2m+n)^3 + 1/5(n/2m+n)^5 + \ldots]$ If $m$ and $n$ are picked in a manner such that m is very large as compared to $n$, then no appreciable error will be introduced by dropping all of the terms except the first one inside the brackets, i.e., $$\text{Log}_e(M) \simeq \text{Log}_e(m) + (2n/2m+n)$$

Changing to base two by dividing the whole equation by $\text{Log}_e 2$, we get $$\text{Log}_2(M) \simeq \text{Log}_2(m) + 2/\text{Log}_e 2 \cdot n/2m+n$$

The first term can be obtained from log table 34 and the second term from correction table 74. If M was the normalized 16-bit input number to log block 32, it would be of the form 1.XXX XXXX XXXX XXXX (where X's are either 0 or 1). We can split M to give us $m$ and $n$ in the following manner:
$m = 1.\text{XXX XXXX XXX0 0000}$ (if we were to use the top 11 bits as m)
$n = 0.000\ 0000\ 000\text{X XXXX}$ (and the bottom 5 bits as $n$).

$m$ can be sent to log table 34 as an address to look up the log of $m$. Only 1024 entries are needed in the table since m has only 10 bits that vary.

For correction table 74 (refer to the formula of the correction term) an approximation, $m'$, of m can be used. A fairly close approximation of $m$ could use the most significant six bits of m. $m' = 1.\text{XXX XXYY YYY0 0000}$ (where the Y's can be any desired fixed combination of 0's or 1's):
$m' = 1.\text{XXX XX11 1110 0000}$ and
$n = 0.000\ 0000\ 000\text{X XXXX}$.
A correction table 74 addressed by $m'$ and $n$ requires only 1024 entries (addressed by the 10 bits of $m'$ and n that vary).

Tables 34 and 74, with 1024 entries each, can easily be constructed to any word size using commonly available programmable read-only memories.

Antilog Block 56

Antilog block 56 is designed to look up the antilog to the base two of, for example, any 16-bit number between 0 and 0.99985 (binary 0.0000 0000 0000 0000 and binary 0.1111 1111 1111 1111). Block 56 consists of antilog table 58 and a correction table 80. Antilog circuit 50 has an input 82, which specifies the output characteristic, that is, the desired binary point location at output 54. The log characteristic at input 52 CHAR of the incoming log number (the top eight bits) is subtracted from the output characteristic on input 82 by a subtractor 84, giving an 8-bit number defining the number of right shifts required to place the binary point of output 54 at the desired place. This process is called denormalization. If the number of shifts required comes out to be negative (meaning left shifts are needed), the number is left unshifted and indication is given that the number is too big to be denormalized. This signal could be used externally to saturate the output to the maximum value.

The contents of antilog table 58 and correction table 80 may be computed in the following manner:

$$\text{Antilog}_2(M) = 2^M = 2^{m+n}$$
$$= (2^n)2^m$$
$$= 2^m + (2^n - 1)2^m$$

where $M = m+n$ and where M is the mantissa of the input.

If we were to use an approximation, $m'$, for m in the second term, we get:

$$2^m + (2^n - 1)2^{m'}$$

The first term is used to form the antilog table and the second term, the correction table. The 16-bit binary value of M is of the form:

$$M = 0.\text{XXXX XXXX XXXX XXXX}$$

If we were to pick the most significant 10 bits as $m$ and the least significant 6 bits as $n$ and use the most significant four bits of M as the approximation for m', we get:

$m = 0.\text{XXXX XXXX XX00 0000}$ $n = 0.0000\ 0000\ 00\text{XX XXXX}$ $m' = 0.\text{XXXX YYYY YY00 0000}$ where Y's in $m'$ can be any desired fixed combination of 0's and 1's.

Antilog table 58, using m as it addresses, and correction table 80, using $m'$ and $n$ as its address, require only 1024 entries each.

Accuracy of the log and antilog numbers is limited only by the size of tables used for them. The size shown in the examples gives an error in the fifth decimal digital (giving an output accuracy of 14 to 15 bits in binary). Such accuracy is more than adequate for digital radar simulation applications.

The following patent applications filed herewith by the present assignee further describe additional features of the prsent digital radar system:

"Earth Curvature and Atmospheric Effects for a Simulated Digital Radar System" patent application Ser. No. 692,817, filed by Jerome W. Meyer docket number W4903, filed by Jerome W. Meyer.

"Data Block Mapping Technique for a Simulated Digital Radar System", patent application Ser. No. 692815, filed by Steve Mori docket number W4095, filed by Steve Mori.

We claim as our invention:

1. A log-antilog conversion circuit adapted for use in a digital radar landmass system to expediate computations by converting linear domain numbers from the digital radar landmass system into log domain numbers prior to computation by the digital radar landmass system and then converting the log domain numbers into linear domain numbers subsequent to computation, comprising:
   normalizer means adapted to respond to the linear domain numbers prior to computation to eliminate leading zeros in the linear domain numbers for putting the linear domain numbers into uniform mantissa form;

characteristic means adapted to respond to the linear domain numbers prior to computation for calculating the log domain characteristic of the linear domain numbers;

log means responsive to the linear domain mantissa for determining the approximate log thereof by providing $\text{Log}(M) \cong \text{Log}(m) + 2n/2m' + n$ where M = the mantissa = $m + n$
$m \gg n$
$m$ = the MSB portion of M,
$n$ = the LSB portion of M, and
$m'$ = the MSB portion of $m$;

antilog means responsive to the log domain numbers subsequent to computation for determining the antilog of the log domain mantissa of the log domain number; and binary point means responsive to the log domain numbers subsequent to computation for determining the linear domain binary point of the received logs.

2. The system of claim 1, wherein the normalizer has a left shifter for eliminating the leading zeros and an encoder in communication with the characteristic means for appropriately compensating the linear domain characteristic of the input number.

3. The circuit of claim 2, wherein the antilog means further comprises a denormalizer for placing leading zeros in the antilog to establish the desired linear domain characteristics.

4. The system of claim 3, wherein the denormalizer has a control responsive to the binary point means for establishing the desired linear domain binary point, and a right shifter responsive to the control for placing the appropriate number of leading zeros.

5. The system of claim 4, wherein the log means has a log table and a correction table for interpolating between the entries of the log tables, and an adder for combining outputs of the two tables.

6. The system of claim 5, wherein the antilog means has an antilog table and a correction table for interpolating between the entries of the log table, and an adder for combining the outputs of the two tables.

* * * * *